United States Patent [19]

Hattori et al.

[11] 4,248,813
[45] Feb. 3, 1981

[54] PROCESS FOR PRODUCING HIGH DENSITY SINTERED PRODUCTS

[75] Inventors: Yoshinori Hattori; Mitsuyoshi Kawamura; Yasushi Matsuo, all of Nagoya, Japan

[73] Assignee: NGK Spark Plug Co., Ltd., Nagoya, Japan

[21] Appl. No.: 60,696

[22] Filed: Jul. 25, 1979

[30] Foreign Application Priority Data

Jul. 28, 1978 [JP] Japan ............................... 53-93032/78

[51] Int. Cl.³ ............................................. C04B 33/34
[52] U.S. Cl. ........................................ 264/62; 264/60; 264/63; 264/65; 264/328.18
[58] Field of Search .................. 264/44, 59, 60, 62, 264/63, 338, 65, 328

[56] References Cited

U.S. PATENT DOCUMENTS

| 3,607,607 | 9/1971 | Beninga | 264/60 |
| 3,666,613 | 5/1972 | Beninga | 264/60 |
| 3,778,336 | 12/1973 | Adams | 264/44 |
| 3,819,439 | 6/1974 | Taylor | 264/60 |
| 3,917,773 | 11/1975 | Gates et al. | 264/44 |
| 4,112,143 | 9/1978 | Adlerborn | 264/62 |

Primary Examiner—Donald J. Arnold
Attorney, Agent, or Firm—Sughrue, Rothwell, Mion, Zinn and Macpeak

[57] ABSTRACT

A process for producing high density sintered product which comprises molding a composite of an inorganic powder and an organic resin, burning off the organic resin, coating the surface of the molding with a rubber film, pressing said moldings under 2 ton/cm² or more of isostatic pressure, and sintering.

7 Claims, 3 Drawing Figures

FIG I(a)
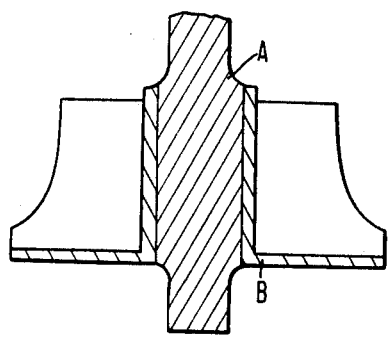
FIG I(b)
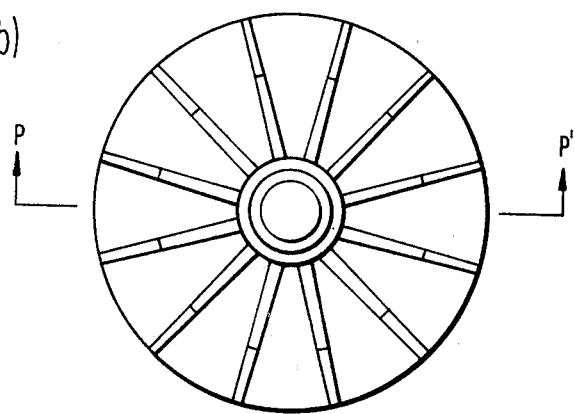
FIG 2
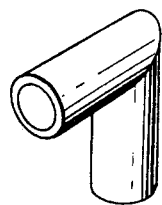

PROCESS FOR PRODUCING HIGH DENSITY SINTERED PRODUCTS

BACKGROUND OF THE INVENTION

1. Field of the Invention

The present invention relates to a process for producing high density sintered products in which complicated shapes can be molded with sintering so as to have a high density. In particular the present invention relates to a process for producing sintered products having a complicated shape such as a turbine rotor so as to have a high density by which good physical and chemical (e.g., anti-oxidation and anti-corrosion) properties are obtained.

2. Description of the Prior Art

Die press molding and isostatic pressure molding are known molding processes however it is difficult to form complicated shapes such as a turbine rotor, etc. by them. Further, though slip cast molding has been known, it also is restricted in terms of the shape of the molded article which can be obtained.

In recent, injection molding has been used for molding synthetic resins. Injection molding comprises adding a synthetic resin to an inorganic powder such as a ceramic powder and injecting the fluid slurry into a die. However, because the amount of the synthetic resin used for maintaining the fluidity of the slurry is large, the sintered goods are very porous and, consequently, dense sintered goods are difficult to obtain.

SUMMARY OF THE INVENTION

It is a principal object of the present invention to provide an improved process for obtaining dense sintered goods having a complicated shape.

BRIEF DESCRIPTION OF THE ACCOMPANYING DRAWINGS

FIG. 1 shows a turbine rotor, where (a) is a cross-section view along the line P—P', and (b) is a view of the upper surface.

FIG. 2 is an oblique view of an L-shaped insulating tube for aircraft ignitors.

DETAILED DESCRIPTION OF THE INVENTION

The present invention provides a process for producing high density sintered products which comprises adding an organic resin to an inorganic powder, molding the composite by, for example, die press molding or injection molding, etc., removing the organic resin by calcination, coating the surface of the molding with a rubber film such as that of TOPTEX latex rubber (produced by Imai Gomu Co.), isostatically pressing the moldings under 2 ton/cm² or more isostatic pressure, and sintering. According to the present process, even if a large amount of the organic resin (e.g., 15 to 50% by weight) is used to carry out the die press molding or injection molding, the resin is burnt off and the openings formed by burning off the resin are then collapsed by 2 ton/cm² or more of the isostatic pressure to increase the bulk density.

Representative examples of the organic resins are acrylic resins, an atactic polypropylene, and the like. The essential properties of the organic resin are good wettability with the inorganic powder, flowability and moldability. Inorganic powders which can be molded in the present invention include silicon powders, metal powders such as iron, etc., and ceramic powders such as silicon nitride, silicon carbide and alumina powders, etc. In the case of using metallic silicon, silicon nitride sintered goods can be obtained by using a nitrogen containing atmosphere in the sintering step.

The mixing ratio of the inorganic powder and the organic resin is determined by the specific gravity and specific surface area of the inorganic powder, the wettability between the inorganic powder and the organic resin, and the like, but in general, the amount of the inorganic powder is about 95 to 50% by weight and the amount of the organic resin is about 5 to 50% by weight.

In order to mold the composite, though any of die press molding, isostatic pressure molding and injection molding may be used, injection molding using a large amount of resin (15 to 50% by weight) to obtain a complicated shape is particularly preferred. Further, in order to burn off the resin, it is necessary to calcine the molding at a temperature higher than the evaporation temperature of the resin, temperatures of about 200° to 800° C. are generally required. In this case, the moldings from which the resin is removed by evaporation or decomposition have low strength and are easily broken. About 98 wt% or more of the resin is removed by the calcining (sometimes, 2 wt% or less of carbon remains). The molding maintains its form by interlocking of the powders. However, if the bulk density of the molding after removal of the resin is about 60% or less of the theoretical value of the bulk density, the molding no longer maintains its form though varying the shape of the molding. The strength of the molding is improved by coating with a rubber film composed of latex rubber in the subsequent processing. The strength of the molding may be increased to a small extent by leaving a small amount of the resin in the molding or by calcining at a slightly higher temperature than the calcination temperature to cause sintering.

Though the rubber film may be formed using a preformed thin rubber film by sealing in vacuum, in order to apply the film to a complicated shape it is preferred that the coating film is formed by applying a liquid rubber emulsion such as a latex rubber to the molding and drying.

An isostatic pressure of 2 ton/cm² or more and preferably 5 ton/cm² or more is required to collapse the openings formed by removal of the organic resin. The higher the pressure is the better, but from the standpoint of the apparatus, the upper limit is generally about 20 ton/cm². Upon application of isostatic pressure the molding generally contracts 2% or more.

Sintering is conducted in a non-oxidation atmosphere at about 600° to 1,300° C. in case of metals, but in the case of silicon it is possible to form silicon nitride by sintering in a nitrogen atmosphere at up to 1,400° C. for about 50 to 100 hours.

The present invention will be illustrated in more detail by reference to the following examples.

EXAMPLE 1

Molding of a turbine rotor as shown in FIG. 1 is illustrated. 20 parts by weight of atactic polypropylene resin and 5 parts by weight of paraffin were added to 100 parts by weight of a metallic silicon powder which passed through a 200 mesh screen. After blending for 80 minutes by means of a kneading machine, the blend was granulated to produce pellets 5 mm or so in size.

Then, injection molding was carried out using the resulting pellets by the same conditions as used in the case of molding a common thermoplastic resin to produce an axis part (A) and a blade part (B) respectively. Removal of the resin from the axis part (A) and the blade part (B) was carried out in a non-oxidation atmosphere at 600° C. or less. The bulk density after removal of the resin was 1.40 g/cm³ in both of the axis part (A) and the blade part (B).

Then, the axis part (A) and the blade part (B) were combined to fit each other (the axis part and the blade part may be integrally molded by injection molding). After latex rubber (produced by Imai Gomu Co.) was applied to the entire surface of the unit, isostatic pressure molding was carried out under 10 ton/cm² of the pressure using castor oil as a medium.

The resulting molding underwent a contraction of 6% in the whole parts thereof, by which the bulk density measured became 1.70±0.01 g/cm³ in any part.

Then, the molding was subjected to nitridation by sintering at a temperature of up to 1,450° C. in a nitrogen atmosphere to obtain a silicon nitride sintered article having 2.72 g/cm³ of the bulk density. The axis part (A) and the blade part (B) in said molding were unified completely.

COMPARISON EXAMPLE 1

After carring out injection molding in the same manner as in Example 1, sintering was carried out in the same manner as in Example 1 except that the pressing by isostatic pressure was omitted and a turbine rotor having the same shape was obtained.

Various properties of the rotors prepared in Example 1 and Comparison Example 1 are shown in Table 1.

TABLE 1

| | Bulk Density | | Weight Gain on Oxidation | Compression Strength | |
|---|---|---|---|---|---|
| | Before Nitridation (g/cm³)*(1) | After Nitridation (g/cm³) | (mg/cm²)*(3) | (ton/cm²)*(2) | Remarks |
| Example 1 | 1.70 | 2.72 | 0.04 | 20 | Invention |
| Comparison Example 1 | 1.40 | 2.27 | 6.3 | 11 | Comparison |

Note:
*(1) Bulk density before nitridation was measured after removal of the organic resin from a cube.
*(2) Compression strength was measured by laying a fiber sheet 5 mm thick on the upper face and the lower face of a cube 1 cm on a side and pressing the cube.
*(3) After heating in air at 1,200° C. for 24 hours.

As is clear from Table 1, the article of the present invention which was pressed by isostatic pressure after removal of the organic resin has high density and compression strength and the increased amount by oxidation at a high temperature is very low.

EXAMPLE 2

20 parts by weight of atactic polypropylene resin and 5 parts by weight of paraffin were blended with 100 parts by weight of a powder of a ceramic mixture composed of 97% by weight (hereinafter all percents are by weight) of an Al₂O₃ powder having 2.5 μ of the average particle size and 1% of each of Mg, CaO and SiO₂ by a blending machine for 80 minutes, and the blend was granulated to from pellets having 5 mm or so of the size. The pellets were molded under the same conditions used for molding common thermoplastic resin to form an L-shaped insulating tube for aircraft ignitors as shown in FIG. 2. After burning off the resin at 600° C. or less in an oxidation atmosphere, TOPTEX latex rubber (produced by Imai Gomu Co.) was applied to the surface and an isostatic pressure of 10 ton/cm² was applied. The resulting molding underwent 6% contraction in the whole parts thereof.

The molding was then placed in the air at 1,600° C. for 1 hour to obtain an Al₂O₃ sintered article. In this case, shrinkage after sintering was 12%.

COMPARISON EXAMPLE 2

After injection molding in the same manner as in Example 2, sintering was carried out in the same manner as in Example 2 except that the pressing by isostatic pressure was omitted. A bend type insulating tube having the same shape was obtained.

Various properties of the tubes prepared in Example 2 and Comparison Example 2 are shown in Table 2.

TABLE 2

| | Bulk Density | | Compression Strength | |
|---|---|---|---|---|
| | Before Sintering (g/cm³)*(1) | After Sintering (g/cm³) | (ton/cm²)*(2) | Remarks |
| Example 2 | 2.81 | 3.88 | 25 | Invention |
| Comparison Example 2 | 2.33 | 3.80 | 19 | Comparison |

Note:
*(1) Measured after removing the organic resin.
*(2) Obtained by laying a 0.5 mm thick fiber sheet on both edges of a ring of the sample having a thickness of 0.5 mm and 10 mm in length and pressing in the axial direction, and calculating the compression strength by dividing the pressure at which the ring was broken by the area of the edge. i.e., $$\text{compression strength} = \frac{\text{load}}{\text{area}}$$

From Table 2 it is understood that the article of the present invention which was pressed by isostatic pressure after removal of the organic resin has high density and compression strength. Further, the shrinkage after sintering in Example 2 is 12% which is lower than that of 18% in Comparison Example 2 and shows a stabilized sintering state.

While the invention has been described in detail and with reference to specific embodiments thereof, it will be apparent to one skilled in the art that various changes and modification can be made therein without departing from the spirit and scope thereof.

What is claimed is:

1. In a process for producing a high density sintered product which comprises molding a composite of an inorganic powder and organic resin, burning off the organic resin and sintering, the improvement which comprises after burning off the organic resin, coating the surface of the molding with a rubber film, pressing said molding under two ton/cm² or more of isostatic pressure, and then carrying out said sintering step.

2. The process of claim 1, wherein molding is carried out by either die press molding or injection molding.

3. The process of claims 1 or 2, wherein said rubber film is composed of latex rubber.

4. The process of claim 1, wherein the sintered product is a rotor of a turbine engine.

5. The process of claim 1, wherein the sintered product is an L-shaped insulating tube for aircraft ignitors.

6. The process of claims 1, 2 or 3, wherein the inorganic powder is a metallic silicon powder and the sintering is carried out in a nitrogen containing atmosphere.

7. The process of claim 1, wherein the resin is burnt off at about 200° to 800° C.

* * * * *

REEXAMINATION CERTIFICATE (1218th)
United States Patent [19]
Hattori et al.

[11] B1 4,248,813
[45] Certificate Issued Mar. 13, 1990

[54] PROCESS FOR PRODUCING HIGH DENSITY SINTERED PRODUCTS

[75] Inventors: Yoshinori Hattori; Mitsuyoshi Kawamura; Yasushi Matsuo, all of Nagoya, Japan

[73] Assignee: NGK Spark Plug Co., Ltd., Aichi, Japan

Reexamination Request:
No. 90/001,712, Dec. 28, 1988

Reexamination Certificate for:
Patent No.: 4,248,813
Issued: Feb. 3, 1981
Appl. No.: 60,696
Filed: Jul. 25, 1979

[30] Foreign Application Priority Data

Jul. 28, 1978 [JP] Japan .................. 53-93032

[51] Int. Cl.$^4$ ............................................. C04B 33/34
[52] U.S. Cl. ......................................... 264/62; 264/60; 264/63; 264/65; 264/328.18
[58] Field of Search ..................... 264/44, 59, 60, 62, 264/63, 65, 328.18, 338

[56] References Cited

U.S. PATENT DOCUMENTS

| | | | |
|---|---|---|---|
| 3,887,412 | 6/1975 | Styhr et al. | 156/89 |
| 4,004,934 | 1/1977 | Prochazka | 106/44 |

FOREIGN PATENT DOCUMENTS

| | | |
|---|---|---|
| 11-13918 | 8/1936 | Japan . |
| 50-78609 | 6/1975 | Japan . |
| 50-95307 | 7/1975 | Japan . |
| 51-25507 | 3/1976 | Japan . |
| 52-121613 | 10/1977 | Japan . |
| 1481819 | 8/1977 | United Kingdom . |
| 1546928 | 5/1979 | United Kingdom . |

OTHER PUBLICATIONS

Yogyo Kogaku Handbook (Ceramics Engineering Handbook) 2/42.
Koatsu Jikken Gijutsu to Sono Oyo (High Pressure Experiment Technique and Its Application); Maruzen Co. Ltd.; 1969.

*Primary Examiner*—Hubert C. Lorin

[57] ABSTRACT

A process for producing high density sintered product which comprises molding a composite of an inorganic powder and an organic resin, burning off the organic resin, coating the surface of the molding with a rubber film, pressing said moldings under 2 ton/cm$^2$ or more of isostatic pressure, and sintering.

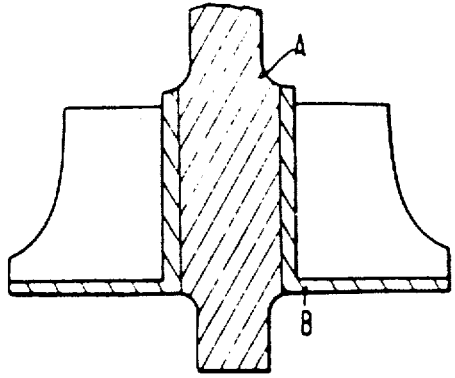

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 6 are determined to be patentable as amended.

Claims 2–5 and 7, dependent on an amended claim, are determined to be patentable.

New claims 8–10 are added and determined to be patentable.

1. In a process for producing a high density sintered product which comprises molding a composite of an inorganic *silicon* powder and *an* organic resin, burning off the organic resin and sintering, the improvement which comprises after burning off the organic resin, coating the surface of the molding with a rubber film, pressing said molding under two ton/cm$^2$ or more of isostatic pressure, and then carrying out said sintering step.

6. The process of claims 1, 2 or 3, wherein [the inorganic powder is a metallic silicon powder and] the sintering is carried out in a nitrogen containing atmosphere.

*8. The process of claim 1, wherein said silicon powder is selected from the group consisting of silicon nitride powders and silicon carbide powders.*

*9. In a process for producing a high density sintered product which comprises molding a composite of an inorganic iron powder and an organic resin, burning off the organic resin and sintering, the improvement which comprises after burning off the organic resin, coating the surface of the molding with a rubber film, pressing said molding under two ton/cm$^2$ or more of isostatic pressure, and then carrying out said sintering step.*

*10. In a process for producing a high density sintered product which comprises molding a composite of an inorganic alumina powder and an organic resin, burning off the organic resin and sintering, the improvement which comprises after burning off the organic resin, coating the surface of the molding with a rubber film, pressing said molding under two ton/cm$^2$ or more of isostatic pressure, and then carrying out said sintering step.*

* * * * *